United States Patent
Okabayashi et al.

(10) Patent No.: US 6,944,794 B2
(45) Date of Patent: Sep. 13, 2005

(54) MICROCONTROLLER WITH DEBUG SUPPORT UNIT

(75) Inventors: Toru Okabayashi, Kawasaki (JP); Koutarou Tagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 557 days.

(21) Appl. No.: 10/057,867

(22) Filed: Jan. 29, 2002

(65) Prior Publication Data

US 2002/0199137 A1 Dec. 26, 2002

(30) Foreign Application Priority Data

Jun. 22, 2001 (JP) ........................................ 2001-189750

(51) Int. Cl.⁷ .............................................. G06F 11/00
(52) U.S. Cl. ............................. 714/28; 714/30; 714/31; 712/227; 703/28
(58) Field of Search ............................ 714/27, 28, 30, 714/31, 37, 34, 35; 712/227; 703/28

(56) References Cited

U.S. PATENT DOCUMENTS

| | | | | |
|---|---|---|---|---|
| 5,053,949 A | * | 10/1991 | Allison et al. ................. | 714/31 |
| 5,491,793 A | * | 2/1996 | Somasundaram et al. ...... | 714/45 |
| 6,233,673 B1 | * | 5/2001 | Higashida .................... | 714/227 |
| 6,430,682 B1 | * | 8/2002 | Dwyer, III .................... | 712/234 |
| 6,493,833 B1 | * | 12/2002 | Utsumi ......................... | 714/30 |

* cited by examiner

Primary Examiner—Robert Beausoliel
Assistant Examiner—Aaron D. Matthew
(74) Attorney, Agent, or Firm—Staas & Halsey LLP

(57) ABSTRACT

The invention is the microcontroller, which comprises CPU, a bus controller, an instruction address bus of a first bit number and an instruction code bus of a second bit number, which connect between the CPU and bus controller, and, further, a debug support unit, which is connected to the instruction address bus and instruction code bus. This debug support unit is also connected to an external in-circuit emulator via a tool bus of a third bit number that is smaller than the first bit number and via a bus-status signal line that reports on the status of this tool bus. The debug support unit has a data output circuit, which, in response to the status information signal, when the branch information contains a branch, outputs the converted instruction address serially to the tool bus, and when the branch information contains no branch, outputs a branchless signal to the tool bus.

14 Claims, 17 Drawing Sheets

INSTRUCTION PREFETCH OPERATION WITH BRANCH BEING GENERATED (NO INSTRUCTION PREFETCH IS CANCELLED)

INSTRUCTION PREFETCH OPERATION WITH BRANCH BEING GENERATED (INSTRUCTION PREFETCH IS CANCELLED)

MICROCONTROLLER WITH DEBUG SUPPORT UNIT

BACKGROUND OF THE INVENTION

1. Field of the Invention

The present invention relates to a microcontroller that has a debug support unit (hereinafter referred to as a DSU), and more particularly to a microcontroller that has a DSU, which is capable of performing an instruction fetch operation and data access at high-speed with respect to an in-circuit emulator (ICE) which stores a program and data for debugging and whose function is to monitor the state of the CPU at the time of execution of program instruction code.

2. Description of the Related Art

Microcontrollers, which are implemented in controlled devices, such as, computer peripherals and consumer electronics, are connected via an external bus to an external memory in which a control program and data, and the like, are recorded, read out instruction code from this memory by outputting an instruction fetch request, and read or write predetermined data by outputting a data access request.

With a microcontroller of this kind, in a debug process at a development stage, the microcomputer is connected to an in-circuit emulator (ICE), which stores a control program, and data, and the like, and whose functions include monitoring states within the microcontroller at the time of execution of instruction code, and is caused to operate in an emulator mode. In order to be capable of operating in this emulator mode, a debug support unit (DSU) is installed, inside the microcontroller of a development stage, which controls access to the ICE.

The microcontroller contains, in addition to a CPU, a bus controller for accessing an external bus. Further, the CPU and bus controller are connected by an address bus and data bus, with a multiple bit structure, or the like, and both are capable of sending and receiving addresses and data, and the like, in parallel, during an access operation. This bus architecture is typically a simple structure in which an address and an access request are output from the CPU when a wait signal from the bus controller is canceled, and, upon receiving this access request, the bus controller converts this wait signal to a wait state and performs external access, and, upon obtaining the accessed data and instruction code shortly afterwards, the bus controller sends this data and instruction code to the CPU, and thus cancels the wait signal.

In a microcontroller of this kind, in order to implement debugging in the above-mentioned emulator mode, the address bus and data bus, or the like, are also connected to a DSU, and control of access between the DSU and the external ICE is required. In other words, the DSU obtains an access request from the CPU, converts a wait signal to a wait state, and outputs an access request to the ICE, and, if data and instruction code are obtained from the ICE, sends this data and instruction code to the CPU and cancels the wait signal.

However, the external ICE, in addition to storing programs and data, or the like, has the function of monitoring the internal state of the microcontroller. A great number of signal lines are employed to monitor this internal state, therefore such a large number of signal lines occupy the majority of the external pins of the microcontroller. As a result, the number of external pins that can be utilized with the tool bus for the transfer of data and addresses, and the like, between the DSU and ICE is limited, and this tool bus cannot implement a large number of multiple-bit structures like the data bus inside the microcontroller, which may utilize a greater number of bits. Consequently, addresses and data must be transferred by serial transfer, and by using time-sharing, via a tool bus, which is between the DSU and ICE, that has a structure of a low number of bits.

For example, unlike the address bus and data bus inside the microcontroller, which are of a 16-bit or 32-bit structure and which perform parallel transfer of addresses and data in a single cycle, the tool bus between the DSU and ICE is of a 4-bit structure. The DSU therefore performs parallel to serial conversion of the addresses and data received from the CPU and performs serial transfer to the ICE by using time-sharing. Thereafter, the DSU performs serial to parallel conversion of the instruction code received from the ICE and sends this converted code to the CPU. The DSU waits until this series of instruction fetch operations is complete before sending a wait signal to the CPU.

Such limitations on data transfer give rise to a problem in that, during operation in the emulator mode, when an instruction fetch operation is frequently generated, the tool bus fills up considerably only by receiving instruction code, which in turn leads to a poor debug processing capacity.

SUMMARY OF THE INVENTION

Therefore, it is an object of the present invention to provide a microcontroller that contains a DSU, which is capable of efficiently controlling access to an ICE.

It is a further object of the present invention to provide a microcontroller that is capable of efficiently performing a CPU instruction fetch operation or data access operation in an emulator mode, even if the width of the tool bus to the ICE is narrow.

In order to resolve the above-mentioned objects, a first aspect of the present invention is the microcontroller, which comprises CPU, a bus controller, an instruction address bus of a first bit number and an instruction code bus of a second bit number, which connect between the CPU and bus controller, and, further, a debug support unit, which is connected to the instruction address bus and instruction code bus. This debug support unit is also connected to an external in-circuit emulator via a tool bus of a third bit number that is smaller than the above-mentioned first bit number and via a bus-status signal line that reports on the status of this tool bus.

In the above-mentioned constitution, the debug support unit has a parallel to serial conversion circuit, which performs parallel to serial conversion of instruction address; a status information generation circuit, which generates a status information signal, that contains branch information and an instruction fetch request, in response to a branch signal and instruction fetch request signal received from the CPU; a status output circuit, which outputs an instruction-address output signal to a bus status signal line in response to the status information signal; and a data output circuit, which, in response to the status information signal, when the branch information contains a branch, outputs the converted instruction address serially to the tool bus, and when the branch information contains no branch, outputs a signal without a branch (hereinafter referred to as "branchless signal") to the tool bus.

In control of access to the ICE, when there is an instruction fetch request without a branch (hereinafter referred to as "branchless instruction fetch request"), this debug support unit does not transfer an instruction address from the tool bus to the ICE serially during a period composed of a plurality of cycles, but instead transfers a branchless signal in a single cycle, for example. Consequently, a more efficient transfer of the instruction address in an instruction fetch request becomes possible.

In order to resolve the above-mentioned objects, a second aspect of the present invention is characterized in that, in a constitution similar to the microcontroller of the first aspect, the debug support unit has a parallel to serial conversion circuit that performs parallel to serial conversion of an instruction address; a status information generation circuit, which generates a status information signal, that contains branch information and an instruction fetch request, in response to a branch signal and instruction fetch request signal received from the CPU; a status output circuit, which, in response to the status information signal, outputs an instruction-address output signal to a bus status signal line; and a data output circuit, which, in response to the status information signal, outputs the converted instruction address to the tool bus in series. The second aspect of the present invention is further characterized in that, when the status information generation circuit has completed a reception of the instruction code that corresponds to a current instruction fetch request, before receiving a next instruction fetch request, the status information generation circuit generates a prefetch status information signal for an instruction-prefetch request to an instruction address that succeeds the instruction address of this current instruction fetch request.

When the debug support unit has finished outputting the instruction address to the ICE with respect to the current instruction fetch request, while the status is in a wait state to the CPU, the debug support unit automatically initiates the execution of an instruction prefetch operation with respect to an instruction address that succeeds the current instruction address. By means of such access control, in a case in which the CPU has output a branchless instruction fetch request after the wait state to the CPU has been canceled, the debug support unit is able to send the already pre-fetched instruction code to the CPU within a short period of time or immediately. As a result, the efficiency of usage of the tool bus of narrow bus width can be improved.

In the above-mentioned second aspect, for the purposes of an instruction pre-fetch request, as described in the above-mentioned first aspect of the invention, it is preferable to output a branchless signal and instruction address output signal to the tool bus and to the bus status signal line. In so doing, it becomes possible to perform an instruction prefetch operation, which may subsequently prove worthless, within a small number of cycles.

In addition, in the above-mentioned second aspect, while executing an instruction prefetch operation to the ICE by generating a status information signal for an instruction-prefetch request, when an instruction fetch request that contains a branch has been received from the CPU, it is preferable that the status information generation circuit interrupt the generation of the status information signal for the above-mentioned instruction prefetch request.

In order to resolve the above-mentioned objects, a third aspect of the present invention is that, in a constitution similar to the above-mentioned microcontroller of the first aspect, the debug support unit has an encoder, which outputs an encoded address that contains, an effective address in this address and an effective digit number signal for this effective address; a parallel to serial conversion circuit that performs parallel to serial conversion of the encoded address; a status information generation circuit, which, in a number of cycles that is equal to the effective digit number, generates a status information signal that contains an instruction fetch request or data access request, in response to an instruction fetch request signal or data access request signal received from the above-mentioned CPU; a status output circuit, which outputs an address output signal to a bus status signal line in response to the status information signal; and a data output circuit, which, in response to the status information signal, outputs the encoded address to the tool bus.

With the above-mentioned debug support unit, at the time of an instruction fetch request or data access request, since an encoded address, for which an effective digit number is added to an effective address, is transferred to the ICE, the bus cycle required for address transfer can be made short.

DESCRIPTION OF THE PREFERRED EMBODIMENTS

An embodiment of the present invention will be described hereinbelow by reference to the figures. However, the scope of protection of the present invention is not limited to the embodiment below but includes inventions appearing in the patent claims and equivalent items.

Figure 1:
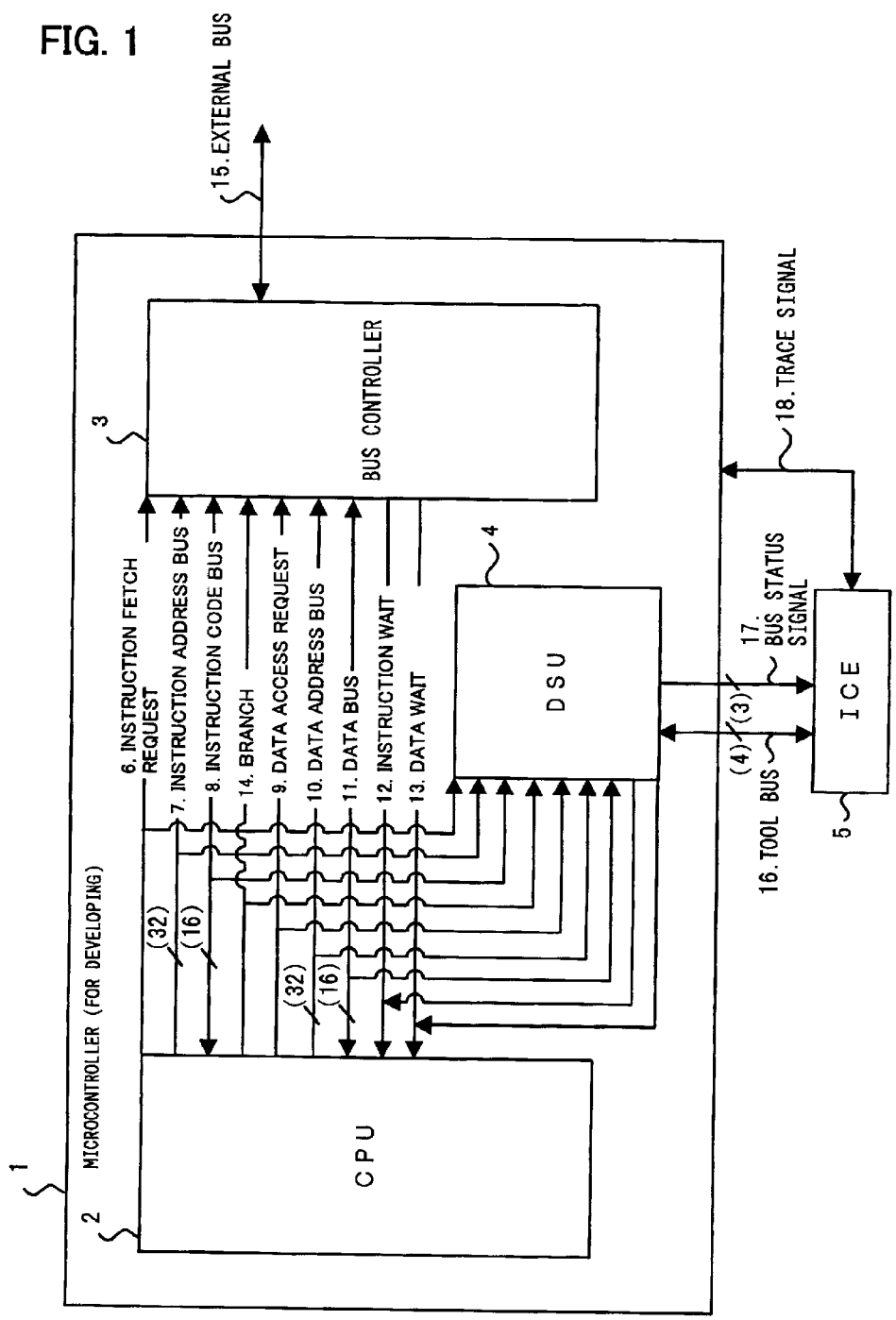
FIG. 1 is a figure showing the constitution of the microcontroller in the present embodiment.

FIG. 1 is a figure showing the constitution of the microcontroller in the present embodiment. Microcontroller 1 has a CPU 2, a bus controller 3 and a debug support unit (DSU) 4, which are connected by an instruction fetch request signal line 6, a 32-bit instruction address bus 7 and 16-bit instruction code bus 8. Further, a data access request signal line 9, a data-address bus 10 and a data bus 11 are provided between the CPU, bus controller and DSU. An instruction wait signal line 12 and data wait signal line 13 are provided for instruction strings and data strings, respectively.

CPU 2 outputs an instruction fetch request signal and instruction address to bus controller 3 in order to fetch instruction code from an external memory connected to an external bus 15. Upon receiving the instruction fetch request signal, bus controller 3 sends an instruction wait signal in response thereto, and sets a wait state for the CPU, and, upon outputting the instruction code to instruction code bus 8, cancels this wait state, and thus receives the next instruction fetch request signal. A data access request is also performed in the same manner.

Microcontroller 1 contains DSU 4 which operates as an interface with an ICE, which has a debug program and a trace function for monitoring states within the microcontroller. Also, in a debug process, the CPU outputs an instruction fetch request or data access request to the DSU and thus operates in an emulator mode.

DSU 4 and ICE 5 are connected by a tool bus 16, which has a bit number that is small in comparison with instruction code bus 8 and data bus 11, for example 4 bits. Further, DSU 4 outputs the state of tool bus 16, along with the type of signal that is output to the tool bus, to ICE 5, by means of a 3-bit bus status signal line 17.

At least six types of tool bus state can be reported to the ICE by means of a bus status signal 17, namely: a no-operation state (no-operation NOP), instruction address state, data-read address state, data-write address state, data receive state or instruction-code receive state, and write-data state.

The number of trace signal lines 18 is at least one hundred, therefore, the number of bits of tool bus 16 is consequently small in comparison with instruction-address bus 7 and data-address bus 10 inside the microcontroller. Consequently, the DSU 4 performs parallel to serial conversion of an address sent from the CPU and then performs serial transfer of same to ICE 5 four bits at a time via the tool bus. Therefore, when an instruction fetch request or data access request is iterated frequently, since the bit number of tool bus 16 is small, this leads to a poor debug processing capacity.

Figure 2A:
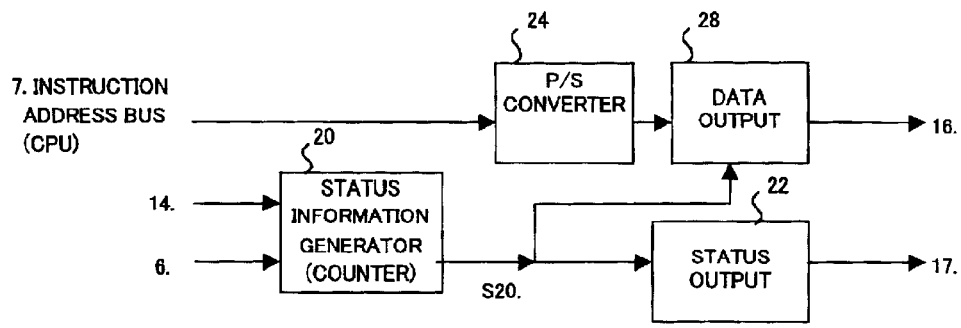
FIG. 2 is a figure that illustrates principles of the present embodiment.
Figure 2B:
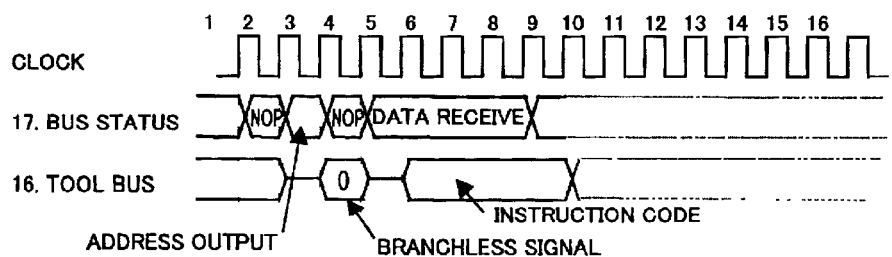
Figure 2C:
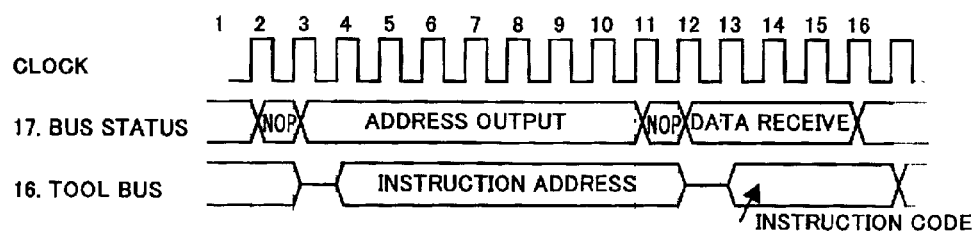

FIG. 2 is a figure that illustrates principles of the present embodiment. FIG. 2A is a figure showing the constitution of an access control unit inside the DSU; FIG. 2B is a timing chart of the operation of this access control unit; and FIG. 2C is an operation timing chart according to the prior art.

The access control unit of the DSU, as shown in FIG. 2A, has: a status information generation circuit 20, which receives a branch signal 14 and instruction fetch request signal 6 from the CPU and then generates a status information signal S20 that contains branch information and an instruction fetch request; a status output circuit 22, which outputs an instruction-address output signal to bus status signal line 17 in response to the status information signal S20; a parallel to serial conversion circuit 24 performs parallel to serial conversion, of a 32-bit instruction address supplied in parallel from the CPU, and outputs 4-bit address in series; and a data-output circuit 28, which then outputs the 4-bit address to tool bus 16 serially. The branch signal contains branchless information when an instruction-code address, which is for an instruction fetch operation, is consecutive, and contains branch information when this instruction-code address is not consecutive. Ordinarily, parsing to determine the existence or nonexistence of a branch is handled within the CPU, however, in a case in which no such branch signal is output by the CPU, the detection of a branch can be performed by the DSU through a comparison of instruction addresses.

In a case in which an instruction, for a fetch, which is supplied by the CPU, contains a branch, status information generation circuit 20 outputs a status information signal S20 during the number of bus cycles that are required to output the instruction address in series. As a result, a counter is integrated into the status information generation circuit 20. On the other hand, in a case in which there is no branch, status information generation circuit 20 outputs a status information signal S20 for only one bus cycle. In this case, data output circuit 28 outputs a branchless signal to tool bus 16 in response to the branchless information contained in status information signal S20.

As shown in FIG. 2C, in a conventional instruction-fetch operation, status output circuit 22 outputs, as a bus status signal, an address output signal, during a period of eight bus cycles between the fourth clock after an NOP state to the eleventh clock thereafter, and data-output circuit 28 performs serial transfer, of a 4-bit instruction address resulting from parallel to serial conversion, to tool bus 16, this transfer being performed twelve times, from the fifth clock to the twelfth clock, with a delay of one cycle. Thereafter, status output circuit 22 outputs a data receive signal in four cycles to bus status signal line 17 and, in response thereto, the ICE sends instruction code in four cycles. Since the ICE references the status of the bus status signal and operates in accordance with this status, the transfer, of an address or data, to the tool bus, may be performed with a delay of one clock cycle.

In this regard, in the present embodiment, as shown in FIG. 2B, when the status information generation circuit 20 detects the nonexistence of a branch from branch signal 14, since the status information generation circuit 20 outputs a status information signal S20, which contains branchless information, to data-output circuit 28 and status-output circuit 22, an address output signal and branchless signal are output, in only one cycle at the 4th or 5th clock, to bus status signal line 17 and tool bus 16. Thereupon, a data receive signal is output to bus status signal line 17, and in response thereto, instruction code is sent back within four cycles, with a delay of one clock cycle.

Figure 3A:
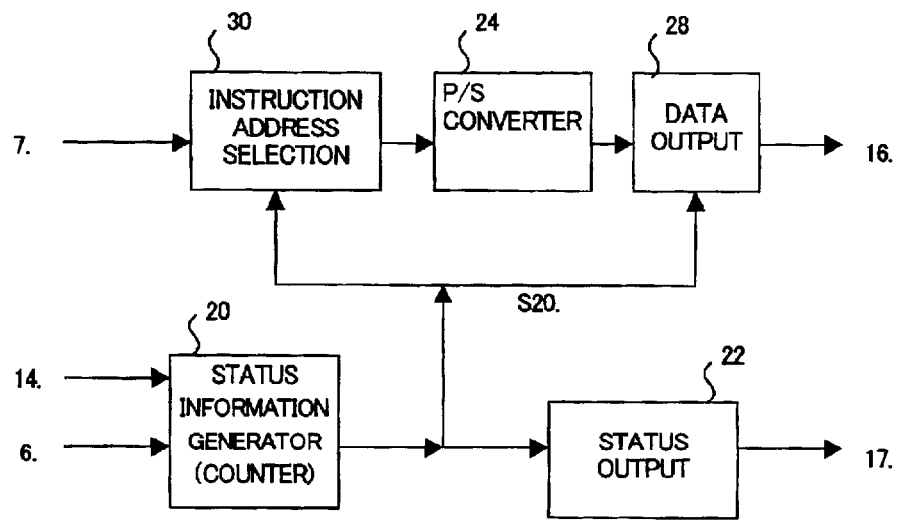
FIG. 3 is a figure that illustrates additional principles of the present embodiment.

FIG. 3 is a figure that illustrates further principles of the present embodiment. As shown in the example of the constitution of the access control unit of FIG. 3A, this access control unit has a status-information generation circuit 20, a status output circuit 22, a parallel to serial conversion circuit 24, a data-output circuit 28, and, in addition, an instruction address selection circuit 30. In this example, at a point in time when status information generation circuit 20 output a status information signal S20 in response to an instruction fetch request signal 6 from the CPU and an instruction-fetch operation is complete, in other words, at a point in time when, after data-output circuit 28 has performed the serial transfer of an instruction address to tool bus 16 or output a branchless signal, the instruction code has been received, if this status information generation circuit 20 has not yet received an instruction-fetch signal from the CPU, only at a time when there is space in the receive buffer of tool bus 16 (not shown), the status information generation circuit 20 outputs a new status information signal S20 for an instruction prefetch operation. Status information signal S20 for this instruction prefetch operation contains branchless information, and in response thereto, the instruction address selection circuit 30 outputs the next instruction address, which is obtained by incrementing the instruction address from the CPU by two, in place of the instruction address from the CPU. Consequently, following parallel to serial conversion of the instruction address of the next address, the converted address is output from data-output circuit 28 to tool bus 16. In the above example, an instruction address containing a branchless signal is incremented in steps of two.

In other words, even if a subsequent instruction fetch request signal has not been received from the CPU, since the tool bus is in an unusable state when the current instruction-fetch operation is complete, as long as there is space in the receive buffer, the status information generation circuit 20 commence an instruction prefetch operation. Consequently, it becomes possible to efficiently employ tool bus 16, whose bit number is small, and, thereafter, at a time when the subsequent instruction fetch request signal has arrived from the CPU, instruction data can be sent in response within a shorter cycle or immediately.

In the above-mentioned instruction-prefetch operation, by using the principles shown in FIG. 2 such that a branchless signal is output from tool bus 16, the efficiency of usage of the tool bus can be raised still further. This means that, in this case, instruction address selection circuit 30 of FIG. 3 is no longer required.

An instruction prefetch operation is performed without verifying whether the subsequent instruction fetch request sent from the CPU is with or without a branch. Therefore, in the course of implementing an instruction prefetch operation, if a subsequent instruction fetch request containing a branch arrives from the CPU, since the previously implemented instruction-prefetch operation is now worthless, status information generation circuit 20 immediately outputs cancel information in the form of a status information signal S20.

Figure 3B:
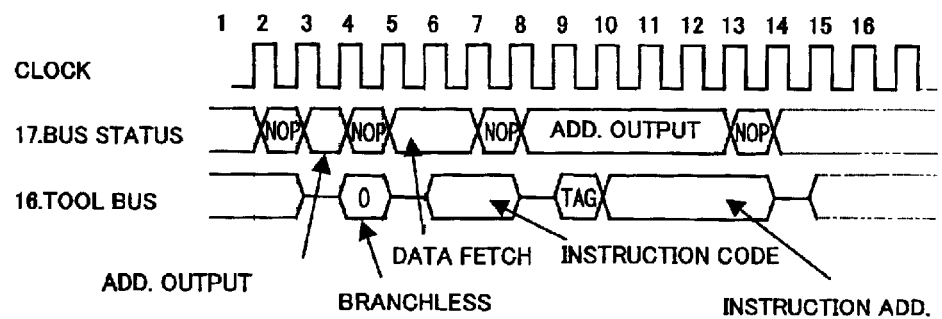

FIG. 3B is an operation-timing chart for a case in which a canceling operation is performed in the course of the above-mentioned instruction-prefetch operation. At the fourth clock, an address is output to bus status signal line 17, and, at the next clock, a branchless signal is output to tool bus 16 to commence an instruction prefetch operation. Thereupon, from the sixth clock, at a point in time when a data receive signal has been output to the bus status signal line 17, and instruction code has been sent back in response thereto to tool bus 16 within two cycles, as a result of status output circuit 22 outputting a no-operation signal NOP, the response of instruction code to tool bus 16 is halted. The ICE thus outputs corresponding instruction code and data to tool bus 16 in the next cycle in response to a status signal of bus status 17. Therefore, the access control unit of the DSU is able to cancel the instruction-prefetch operation by outputting this NOP signal to the bus status 17.

Figure 4A:
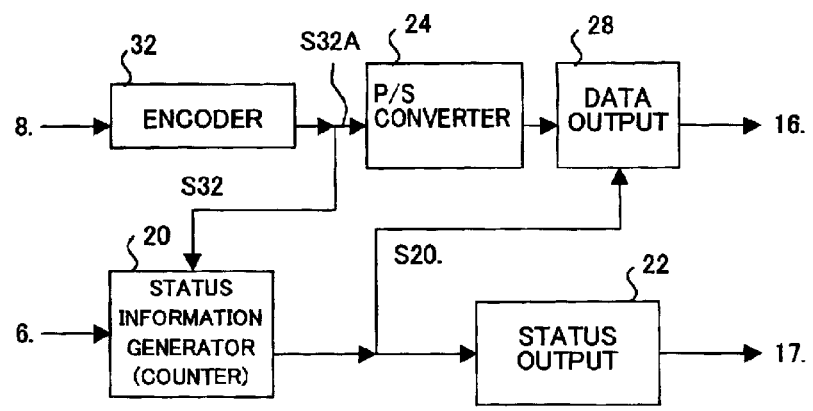
FIG. 4 is a figure that illustrates further additional principles of the present embodiment.

FIG. 4 is a figure that illustrates further additional principles of the present embodiment. In an instruction fetch request or data access request, the DSU must perform parallel to serial conversion of an address to transfer this address to tool bus 16. Here, with regard to a lower-order address, for example, higher-order bits are all "0" and only lower-order bits contain an effective address. Therefore, as shown in FIG. 4A, an encoder 32 analyses an instruction address supplied from the CPU, and encodes this address as an effective address digit number (strictly speaking the number of transfer cycles) and as an effective address. For example, in a case in which a 32-bit instruction address is "00000888" (shown in base 16), an encoded address "3888", which is composed of an effective digit number 3 and an effective address "888", is generated by encoder 32. Then, this encoded address S32A is output to parallel to serial conversion circuit 24, and the address resulting from this parallel to serial conversion is transferred from data-output circuit 28 to the tool bus.

Since the number of transfer cycles for the address, which has been thus encoded, is four, this being a smaller number than eight ordinary required for the transfer of an address, an effective digit number signal (TAG signal) S32B is supplied from encoder 32 to status information generation circuit 20, and status information generation circuit 20 in turn outputs a status information signal S20 during a period composed of a number of cycles that is one greater than this effective digit number, i·e·4 cycles. In other words, status information generation circuit 20 outputs status information signal S20 while the counter contained in this circuit counts a number of cycles that is one greater than the effective digit number.

Figure 4B:
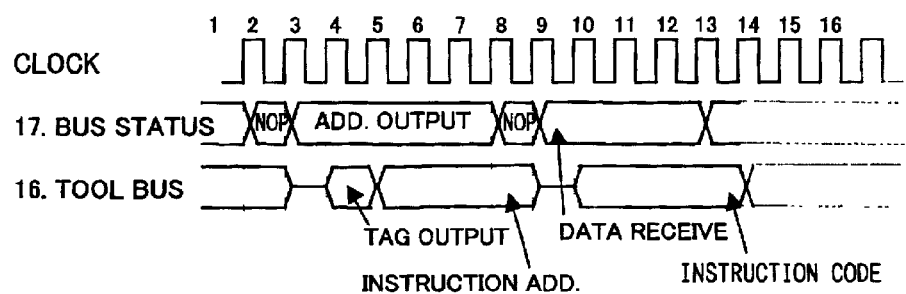

FIG. 4B is a timing chart, for the above operation, that shows that the address output signal is output to bus status signal line 17 for a period of four clock cycles from a fourth to an eighth clock, and a TAG output, which is an effective digit number signal, and an effective instruction address, are output in series via tool bus 16 for a period of four clock cycles from a fifth to a ninth clock, which period is one clock behind the former period. The ICE recognizes that the sent address is encoded because the cycles in which an instruction address is transferred to tool bus 16 is shorter than the ordinary eight cycle, decodes the address, generates a 32-bit instruction address, and performs an instruction fetch operation.

Figure 5:
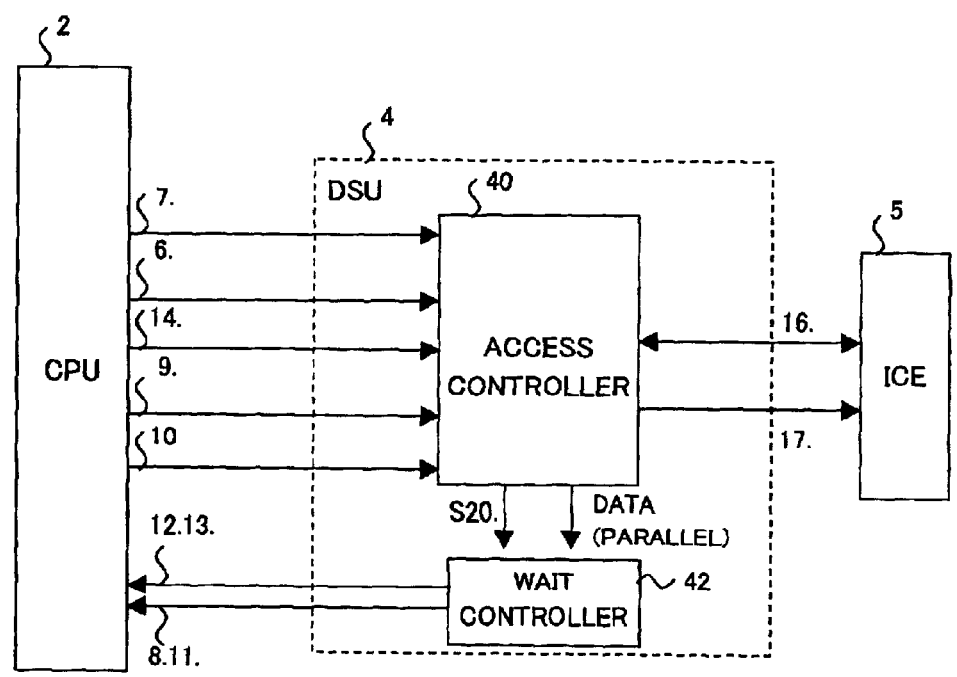
FIG. 5 is a figure showing an example of the constitution of DSU 4.

The principles of the present embodiment have been described hereinabove, but a more concrete description will now follow. FIG. 5 is a figure showing an example of the constitution of DSU 4. DSU 4 is constituted by an access control unit 40 and a wait control unit 42. An instruction fetch request signal line 6, instruction address bus 7, branch signal line 14, data access request signal 9, and data bus 10 are connected to the access control unit 40, and wait signal lines 12, 13, a data bus and instruction code bus 8, 11, are connected to the wait control unit 42.

Access control unit 40 executes an instruction fetch operation with respect to ICE 5 in response to an instruction fetch request signal and branch signal, and executes a data-read or data-write operation with respect to ICE 5 in response to a data access request signal. When access control unit 40 receives an instruction fetch request signal or data access request signal, same generates a status information signal S20, and wait control unit 42 outputs wait signals 12, 13 to the CPU to inhibit the issue of any further request signals. In addition, if access control unit 40 receives instruction code or data from the ICE, wait control unit 42 transfers this data to the CPU via the data bus or instruction code bus 11, 8, and cancels the wait signal. As a result, the CPU is able to issue the next request signal.

Figure 6:
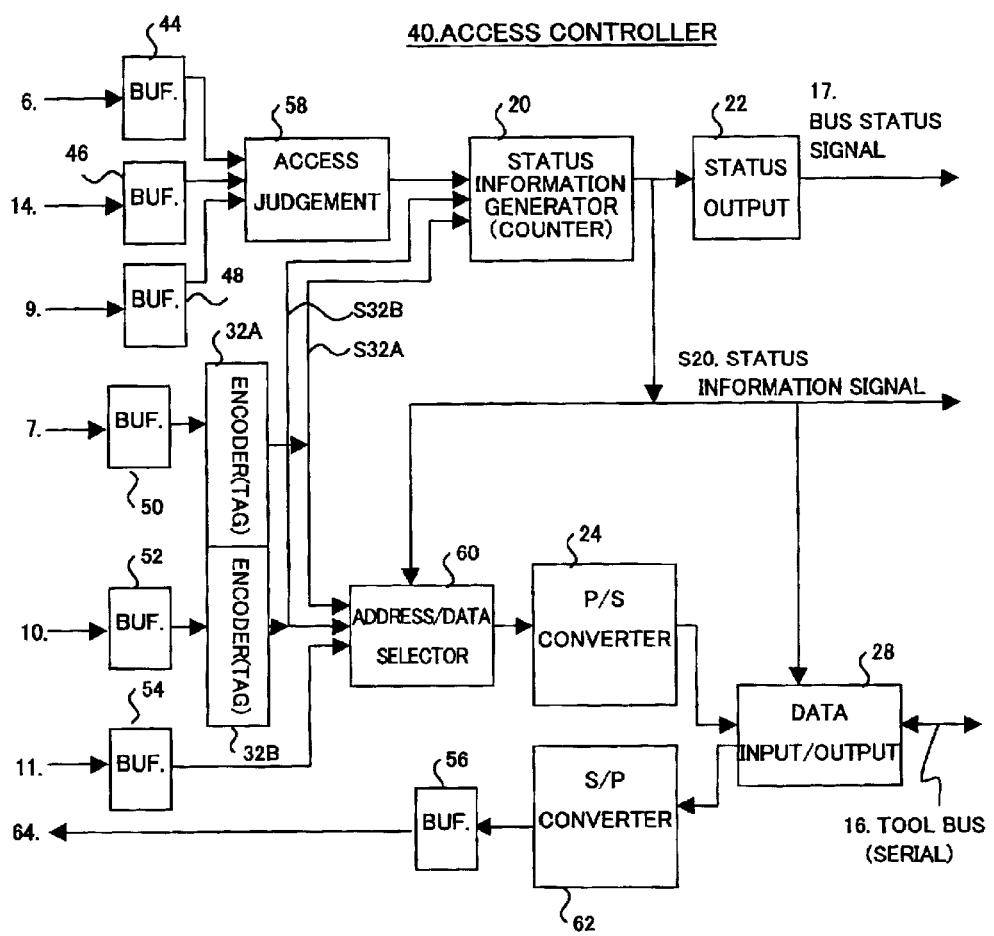
FIG. 6 is a figure showing the constitution of access control unit 40 in detail.

FIG. 6 is a figure showing the constitution of access control unit 40 in detail. Access control unit 40 has input buffers 44, 46, 48, 50, 52, 54, and an output buffer 56, and, in addition, an access judgment circuit 58, to which an instruction fetch request signal 6, branch signal 14 and a data access request signal 9 are inputted, and which accordingly makes a judgment on the type of access required. Access types include a branchless instruction fetch request, an instruction fetch request that contains a branch, a data-read request, and a data-write request. The output of the access judgment circuit, and effective digit number signals (TAG signals) S32A, S32B of encoders 32A and 32B, are supplied to status information generation circuit 20.

Further, an address/data selection circuit 60, which selects an address and data, is provided in access control unit 40, and an encoded instruction address, encoded data address, and write data, are selected, in accordance with a status information signal S20 generated by status information generation circuit 20, and then supplied to a parallel to serial conversion circuit 24.

In addition, instruction code or read-out data, which is received by a data input/output circuit 28, undergoes serial to parallel conversion in a serial to parallel conversion circuit 62, and is then output from output buffer 56 to wait control unit 42 via data bus 64. Further, a status information signal S20 is also output to wait control unit 42, and in response thereto, a wait signal is then output.

By means of access control unit 40 of FIG. 6, all three types of access control illustrated using FIGS. 2, 3, 4 are implemented. In other words, with regard to a branchless instruction fetch operation, an instruction address output signal is output from status output circuit 22 to bus status signal line 17 in a single cycle, and, in the next single cycle, a branchless signal is output from data input/output circuit 28 to tool bus 16. Further, also when an instruction prefetch operation is performed, a branchless signal is output to tool bus 16 as described above. Further, an instruction address and data address are both encoded in encoders 32A, 32B as an effective digit-number TAG signal and effective address signal, and then supplied to parallel to serial conversion circuit 24. Further, data input/output circuit 28 then transfers a TAG signal and effective address signal in series to tool bus 16.

According to the access control described above, on the basis of status information signal S20, which is generated by status information generation circuit 20, status output circuit 22 and data input/output circuit 28 transfer a corresponding bus status signal, address and data to the ICE. Therefore, an access control operation, at the core of which is a status information generation circuit 20, will be described hereinbelow by means of a flow chart.

Figure 7:
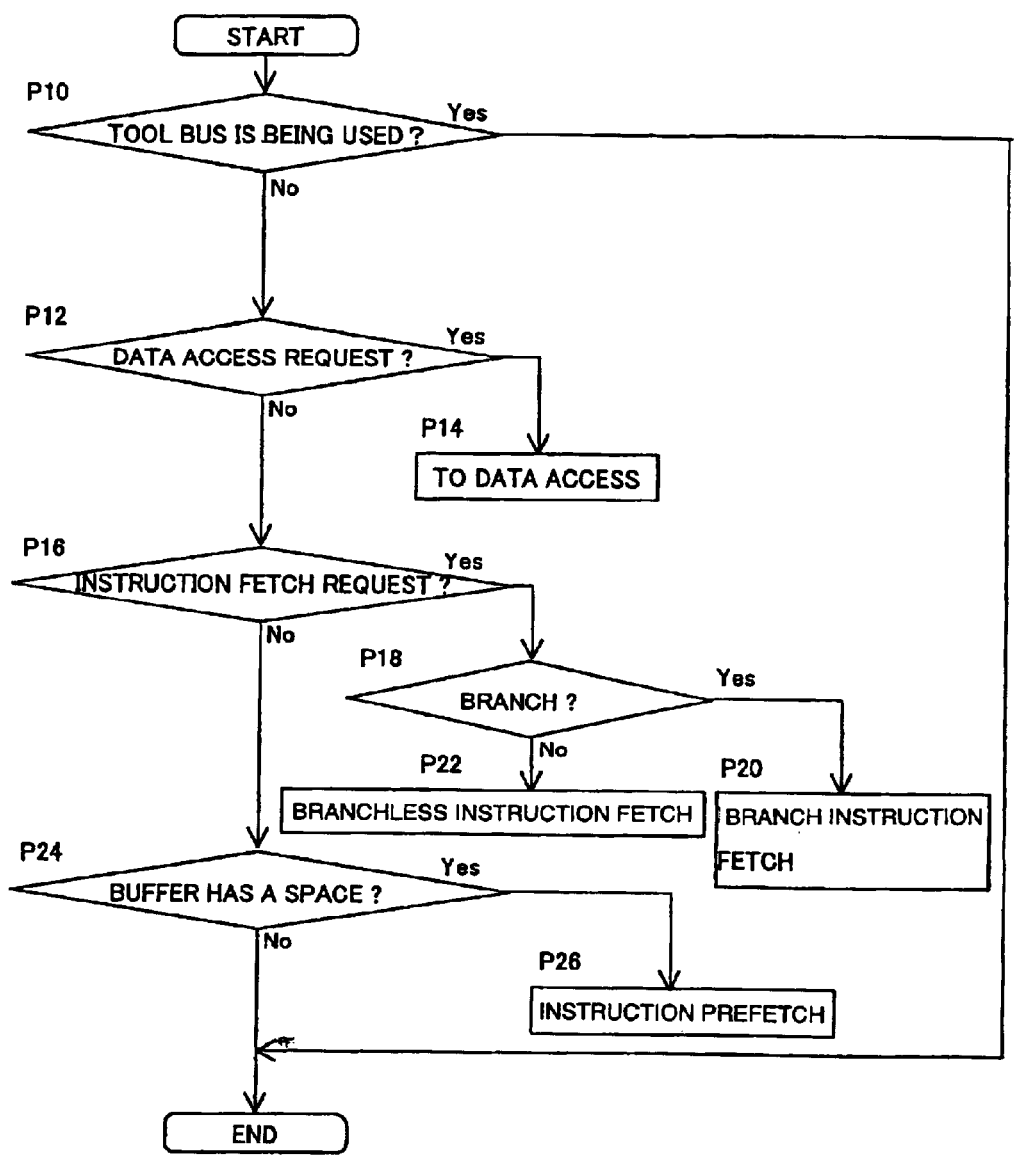
FIG. 7 is a flow chart showing operations within the access control unit.

FIG. 7 is a flow chart showing operations within the access control unit. Status information generation circuit 20 generates a status information signal for access control and is therefore in a position to know whether or not the tool bus is currently being used. Therefore, if the tool bus is not being used (P10), status information generation circuit 20 checks whether a data access request or an instruction fetch request has been issued by the CPU. Only when the wait state of the CPU has been canceled by a wait signal does the CPU issue the above-mentioned request signal. Further, as shown in FIG. 7, a data access request is processed preferentially.

If a data access request is issued, data access is executed in response thereto (P14). Further, if an instruction fetch request is issued (P16), a judgment regarding the existence or nonexistence of a branch is made from a branch signal (P18), and, if a branch has been generated, an instruction fetch operation with a branch is executed (P20). Also, if a branch has not been generated, an instruction fetch operation without a branch is executed (P22).

At such a time as when neither a data access request nor an instruction fetch request are present, and the tool bus is not used following completion of a data access operation or an instruction fetch operation, and, if there is space to store instruction data in the output buffer inside the wait control unit (P24), status information generation circuit 20 generates a prefetch status information signal to execute an instruction prefetch operation (P26).

Figure 8:
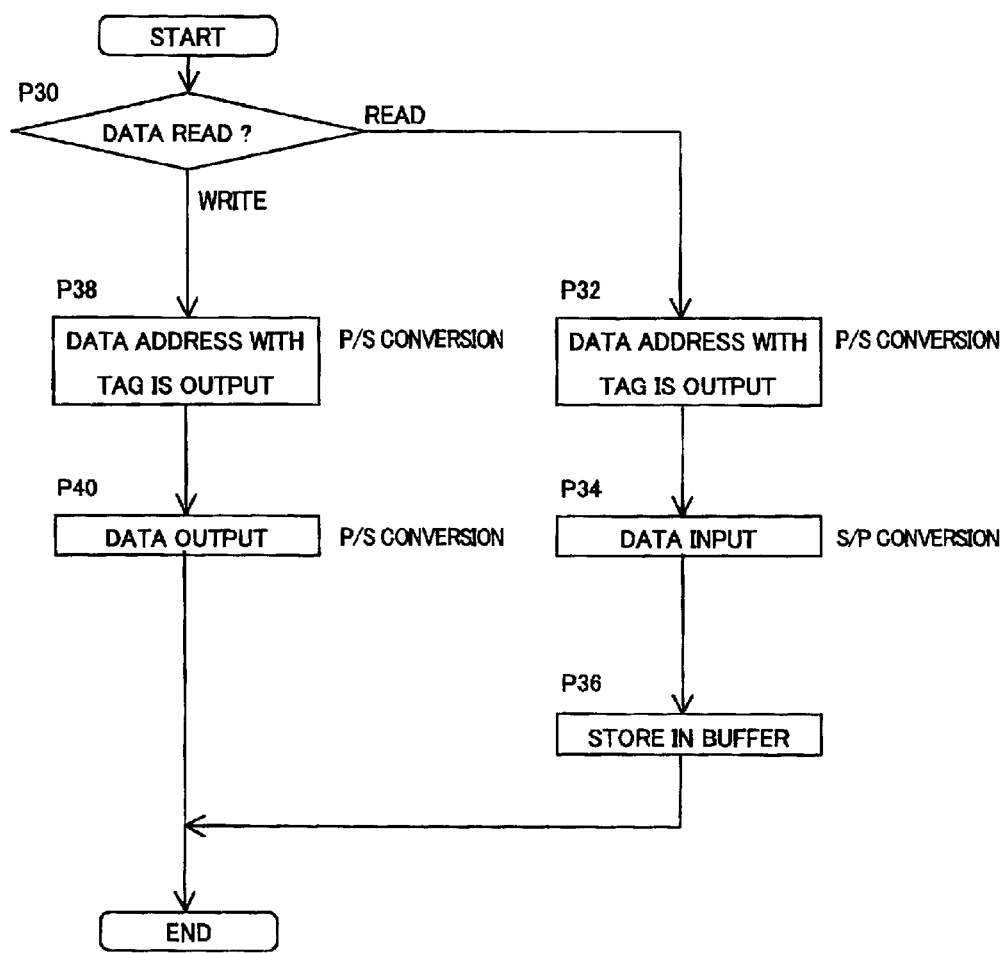
FIG. 8 is a flow chart for data access.

FIG. 8 is a flow chart for data access. When a data access request is received, data access is executed. In a case in which a data access request is for a data-read operation, in response to a status information signal S20, address/data selection circuit 60 outputs an encoded data address, and a data address, which has undergone parallel to serial conversion, is output from data input/output circuit 28 to the ICE via tool bus 16 (S32). Thereupon, read data, which is output from the ICE, is input to data input/output circuit 28 (S34) and then stored in the buffer inside the wait control unit (P36). Also, in a case in which a data access request is for a data-write operation, in response to a status information signal S20, an encoded data address, which has undergone parallel to serial conversion, is output to tool bus 16 (S38), and, thereafter, write data is output to tool bus 16 (S40).

Figure 9:
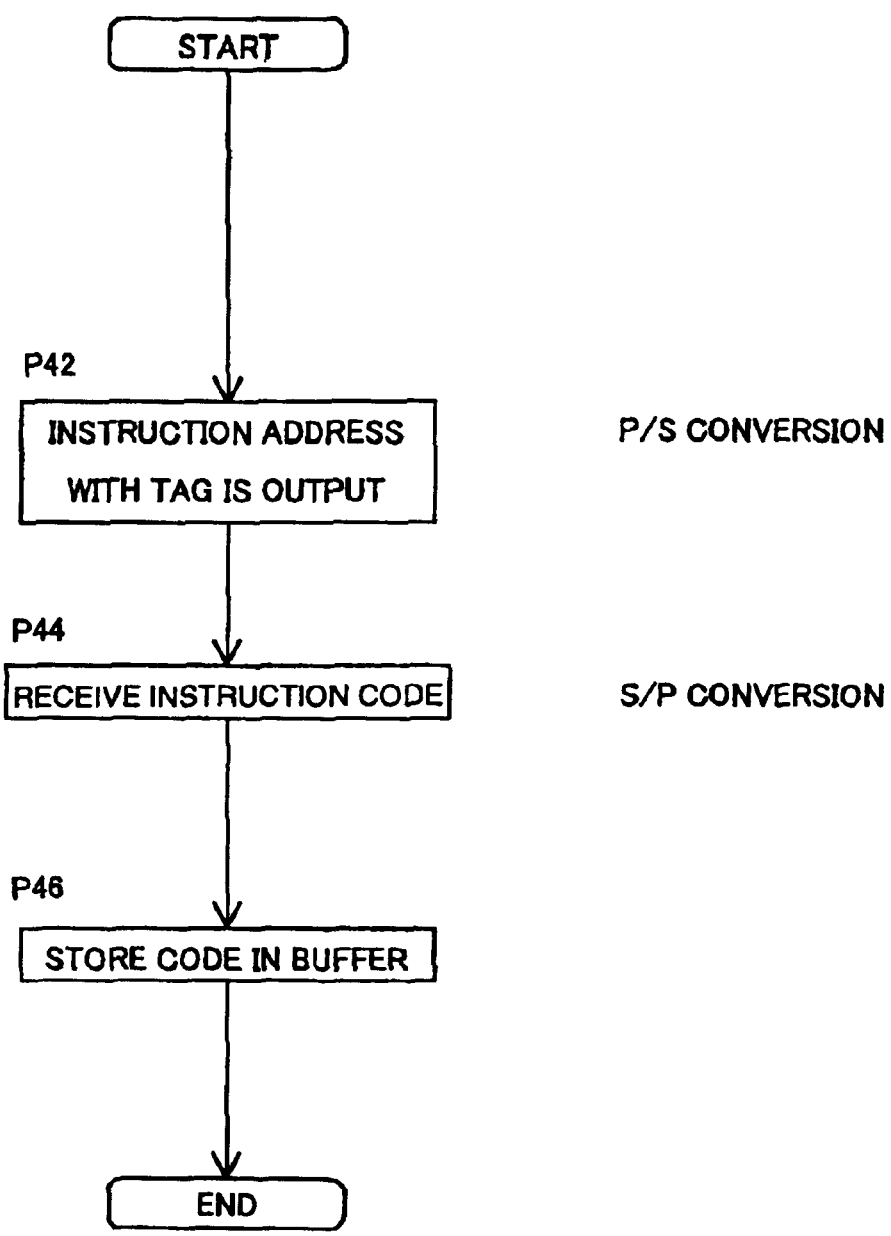
FIG. 9 is a flow chart for an instruction fetch operation with a branch.

FIG. 9 is a flow chart for an instruction fetch operation with a branch. In a case in which an instruction fetch operation is performed with a branch, an encoded instruction address, which is composed of TAG data and an effective address, is output in series from data input/output circuit 28 to tool bus 16 (P42). Since this instruction address is encoded, the number of transfer cycles is smaller than when the address is not encoded. The ICE sends instruction code in response, and data input/output circuit 28 receives this instruction code (P44) and stores same in a buffer (P46).

Figure 10:
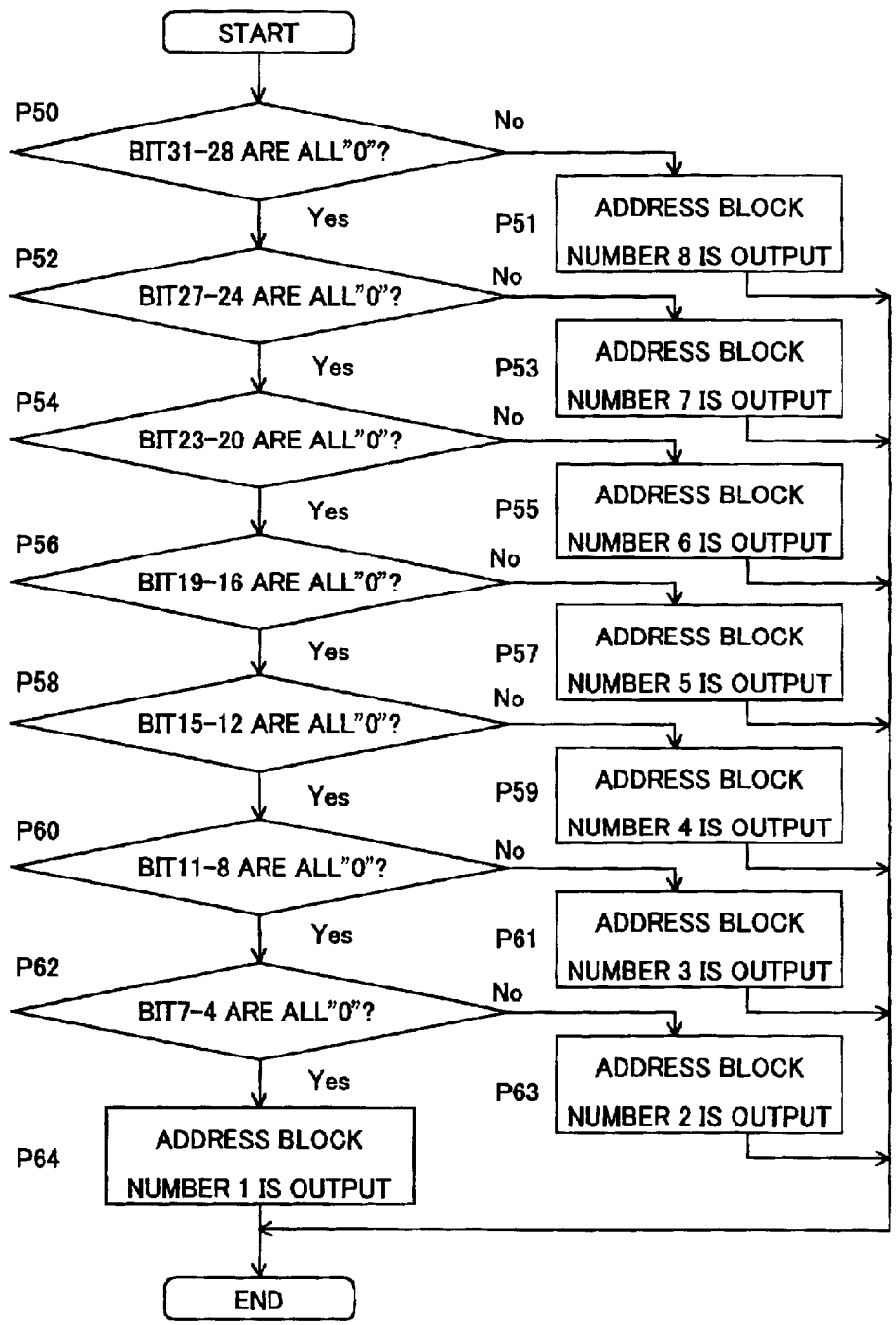
FIG. 10 is a flow chart for encoding by the encoder.

FIG. 10 is a flow chart for encoding by the encoder. The flowchart of FIG. 10 shows an operation of generating an effective digit number (TAG), which number is detected by an encoding operation. A 32-bit address has eight digits in base 16. Since the tool bus transfers data four bits at a time, these four bits define one address block, and the number of blocks from which an effective address is composed constitutes the TAG data.

As shown in FIG. 10, an instruction address or data address, which is input, is analyzed starting from the higher-order digits and if the highest-order bit 31-28 is not 0, all eight digits are effective, and TAG=8 is output as the number of effective address blocks (P50, P51). If the highest-order bit 31-28 is 0 and the next higher-order bit 27-24 is not 0, seven digits are effective, and TAG=7 is output as the number of effective address blocks (P52, P53). Similarly, for values below these, when the higher-order bits are all 0, the number of address blocks for the remaining lower-order bits are output as the TAG data. In a case in which higher-order bits 31-4 are 0, the number of effective-address blocks is 1 (P64).

In the example above, only when TAG=6 or less is an encoded address transferred in series. When TAG=7 or more, the original address is transferred in series as-is.

Figure 11:
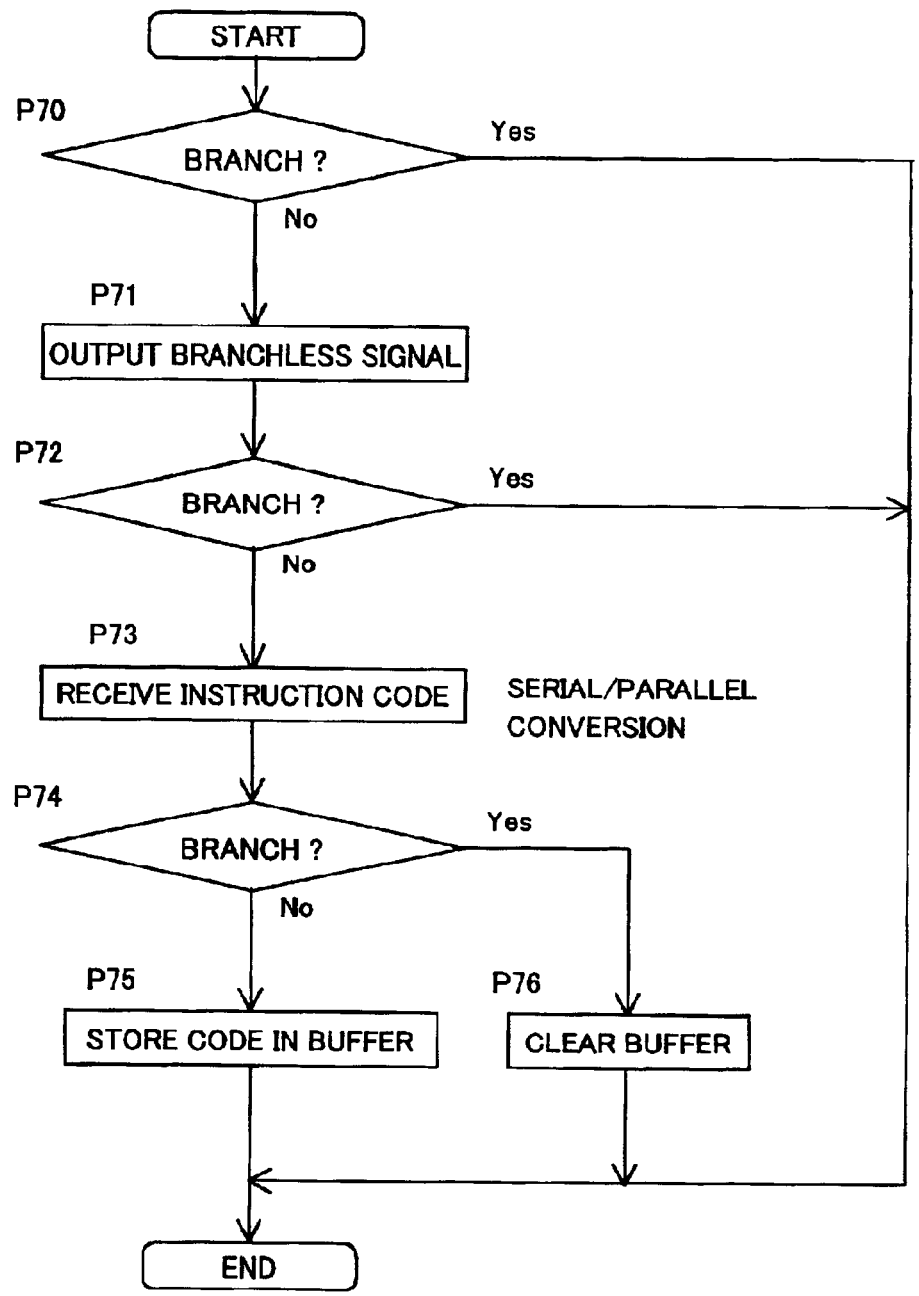
FIG. 11 is a flow chart for a branchless instruction fetch operation or for an instruction prefetch operation.

FIG. 11 is a flow chart for a branchless instruction fetch operation or for an instruction prefetch operation. A branchless instruction fetch operation and instruction prefetch operation are both branchless instruction fetch operations. In FIG. 11, a judgment is made in each step (P70, P72, P74) as to whether or not a branch has been generated for an instruction prefetch operation. When status information generation circuit 20 generates a status information signal S20 to indicate a branchless instruction-address output, in response thereto, status output circuit 22 outputs an address output signal to bus 16 status signal line 17, and, in the next cycle, data input/output circuit 28 outputs a branchless signal to the tool bus 16 in only one cycle (P71). In response thereto, when the ICE sends instruction code in response that corresponds to the next instruction address, data input/output circuit 28 receives the instruction code (P73) and stores same in a receive buffer (P75).

In the course of an instruction-prefetch operation, when a branch signal is received that indicates that a branch is contained in the next instruction fetch request, this instruction-prefetch operation is canceled immediately. Further, after instruction code has been received, this received instruction code is cleared during the cancel operation (P76).

A branchless instruction fetch operation is also an operation like that mentioned above. However, when an instruction fetch operation is branchless, since it has been established that an instruction fetch request has already been received and that this request is branchless, no branch generation occurs.

Figure 12:
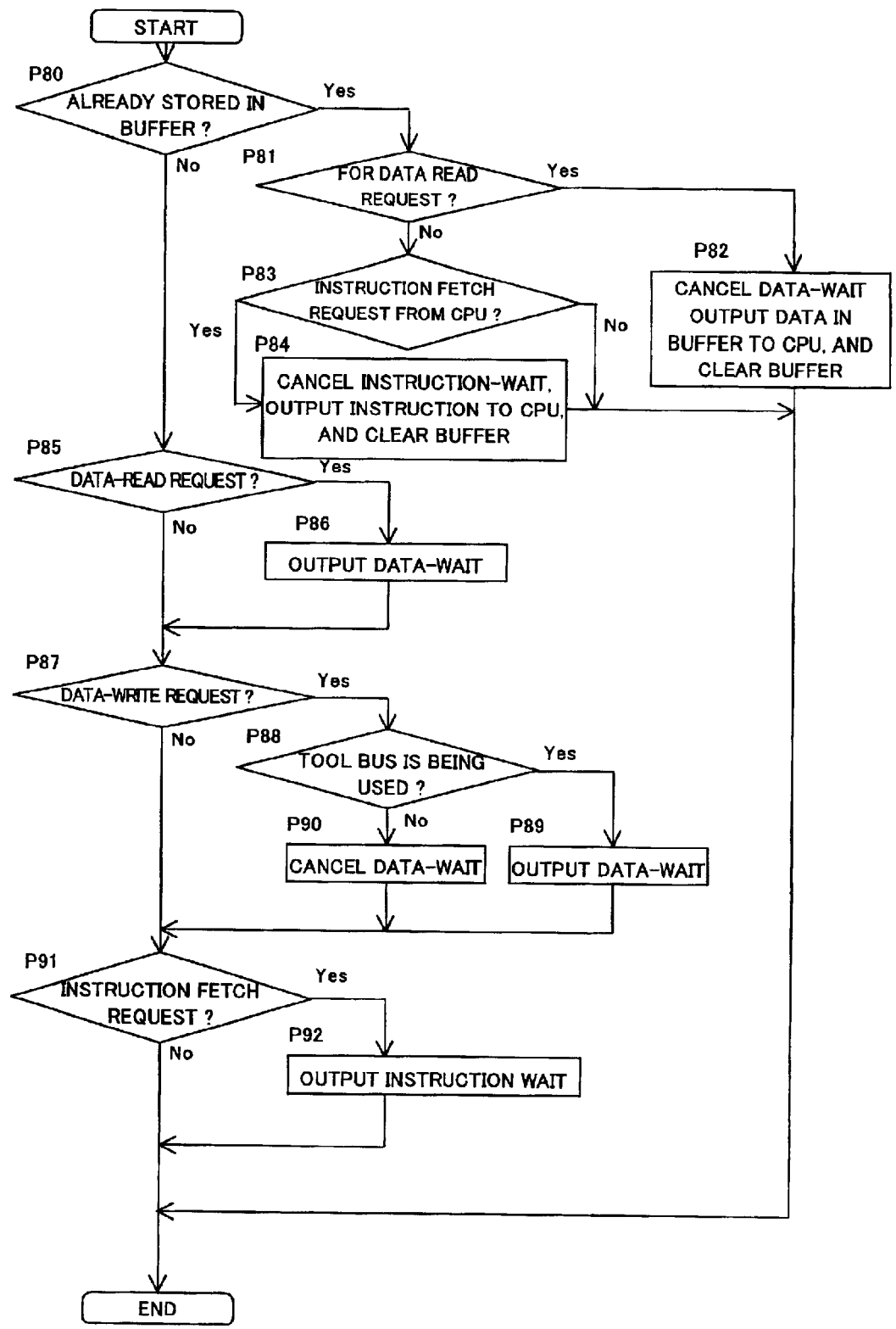
FIG. 12 is a flow chart for wait control by the wait control unit.

FIG. 12 is a flow chart for wait control by the wait control unit 42. Wait control is essentially as follows: when the CPU issues an instruction fetch request or data access request in a state in which a wait state has been canceled, the DSU issues a wait signal to the CPU and executes access control that corresponds to the received request. Then, when this access control ends, the DSU cancels the wait state of the CPU and allows the next request to be issued.

As may be seen from FIG. 12, when instruction code or data is stored in a receive buffer inside wait control unit 42 in the DSU (P80), if this is for a data-read request, a data-wait state is canceled, and data in this buffer is output in parallel to the CPU, and the buffer is cleared (P81, P82). Also, even if there is instruction code inside the receive buffer, if this instruction code corresponds to an instruction fetch request that has been issued from the CPU, an instruction-wait state is canceled, and instruction code in the buffer is output to the CPU, and the buffer is cleared (P83, P84). In addition, even when instruction code is stored in the receive buffer and this corresponds to an instruction prefetch operation, in a case in which an instruction fetch request has not yet been output from the CPU, this instruction code is not sent to the CPU.

Subsequently, when a data-read request is received (P85), a data-wait signal is issued to the CPU (P86), and data-read control is thus executed. Further, if a data-write request is then received (P87), if the tool bus is being used, a data-wait signal is issued to the CPU (P88, P89), and data-write control is put on hold until there is space in the tool bus. When the tool bus is not being used or when it is predicted that the tool bus will shortly not be used, a data-wait state is canceled (P90) and received write data is transferred from the tool bus to the ICE.

Further, when an instruction fetch request is received (P91), an instruction-wait signal is issued to the CPU (P92), and instruction-fetch control is thus executed.

A description follows hereinbelow, by means of an operation-timing chart, of concrete examples of an instruction-prefetch operation, data-read operation and data-write operation of the present embodiment.

Figure 13:
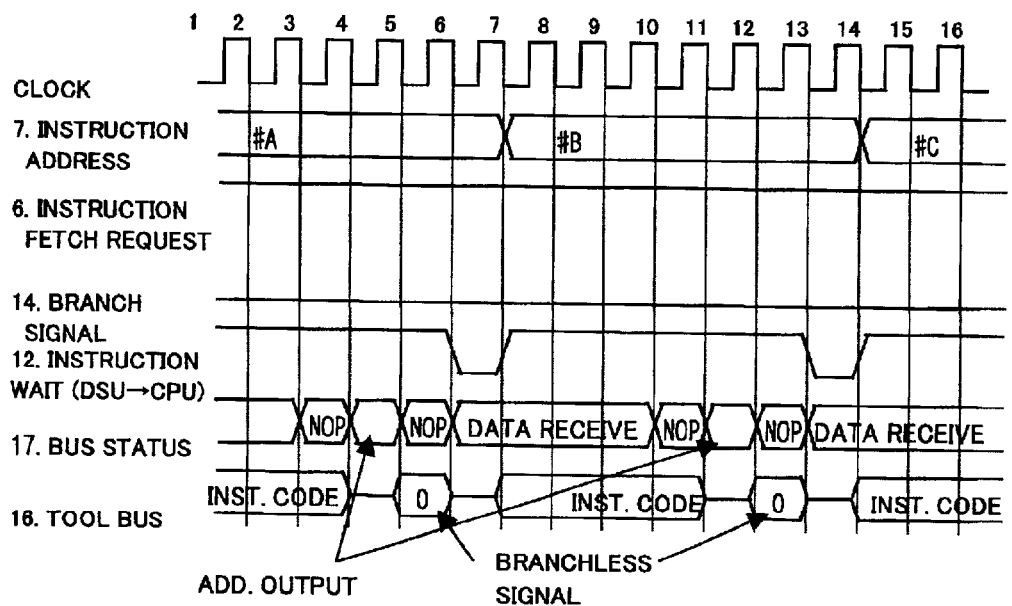
FIG. 13 is a timing chart for an instruction prefetch operation when no branch is generated.

FIG. 13 is a timing chart for an instruction prefetch operation when no branch is generated. In this example, three consecutive instruction fetch requests are issued. The relationship between clocks and given states is described hereinbelow, and in this description the rising edge of a clock is used as a reference point.

First of all, when instruction code is received with respect to an instruction fetch request for an instruction address #A, an address output, which is for an instruction prefetch operation, is output to bus status signal line 17 at the fifth clock, and, after a single clock, a branchless signal is output to tool bus 16. In other words, in the instruction prefetch operation, since it is predicted that instruction code will be fetched from an address that follows the address of the current instruction fetch request, the DSU outputs a branchless signal, and a request is made such that instruction code at the next address is output to the ICE.

When the DSU outputs fetched instruction code to the CPU via instruction code bus 8 (not shown), the DSU also cancels an instruction wait state at the seventh clock, and receives the next instruction fetch request. Meanwhile, an address #B is output to instruction address bus 7. However, with the next instruction fetch operation having already begun in accordance with the instruction prefetch operation, while the DSU is outputting a continuous data receive signal to bus status signal line 17, the DSU also receives instruction code. After the ICE has received a branchless signal, same sends out 16-bit instruction code within four cycles in response to a data receive signal in bus status 17. This ICE operation is a fixed operation.

When instruction-code reception is complete, since tool bus 16 is unoccupied, the DSU commences an instruction prefetch operation if the receive buffer inside the wait control unit is unoccupied. This being so, since the next instruction fetch operation is also initiated before a request is received for this fetch, it is possible to raise the efficiency of usage of the tool bus without the tool bus having to remain in an unoccupied state. As a result, instruction code with respect to an instruction fetch request is output to the CPU within a short cycle period.

Figure 14:
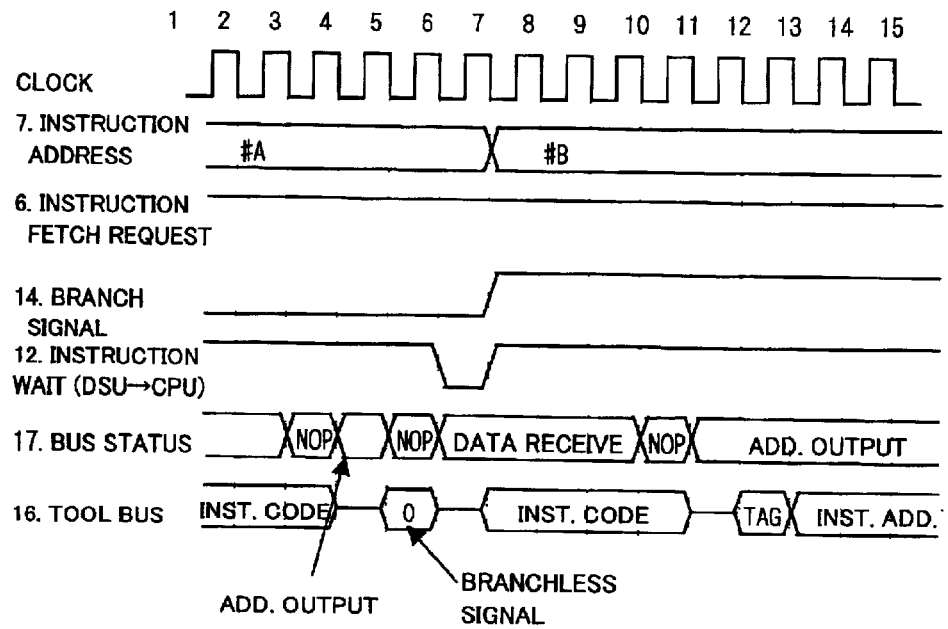
FIG. 14 is a timing chart for an instruction prefetch operation when a branch is generated.
Figure 14:
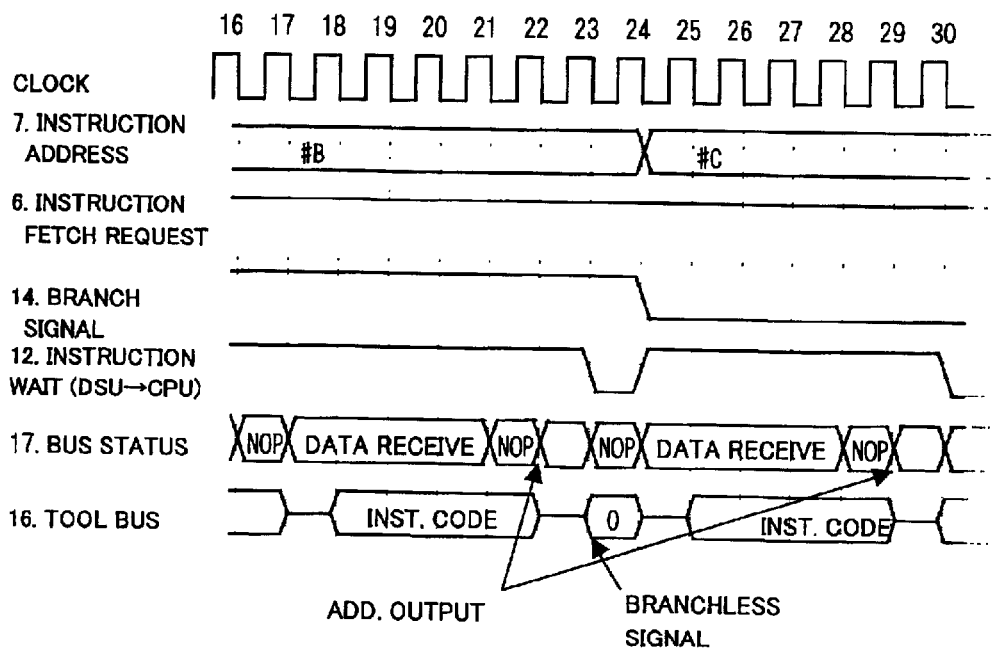

FIG. 14 is a timing chart for an instruction-prefetch operation when a branch is generated. In this example, even if a branch is generated by the DSU, no cancel operation is performed. When instruction-code reception, which is for an instruction fetch request with respect to instruction address #A, has finished, the DSU outputs an address output signal to the bus status signal line 17 at the fifth clock and outputs a branchless signal to the tool bus 16, in order to initiate an instruction prefetch operation. Meanwhile, the DSU outputs a data-receive signal to the bus status signal line 17, and thus receives instruction code in series within four cycles. Thus far, the operation is like that in FIG. 13.

However, when an instruction wait state is canceled at the seventh clock, and the next instruction fetch request is received, branch signal 14 has a branch (H level). Therefore, when instruction-code reception in the instruction prefetch operation has finished, at the twelfth and subsequent clocks, the DSU outputs TAG data and an effective address, which are the result of the encoding of instruction address #B, to the tool bus 16, and from the eighteenth clock, receives instruction code once again. When this instruction-code reception has finished, in order to perform an instruction prefetch operation again from the twenty-third clock, an address output signal is output to the bus status signal line 17 and a branchless signal is output to the tool bus 16.

In the example of FIG. 14, the CPU is prevented from issuing consecutive instruction fetch requests that contain a branch. Consequently, two instruction-code reception operations with respect to instruction address #B are prevented from being iterated every time.

Figure 15:
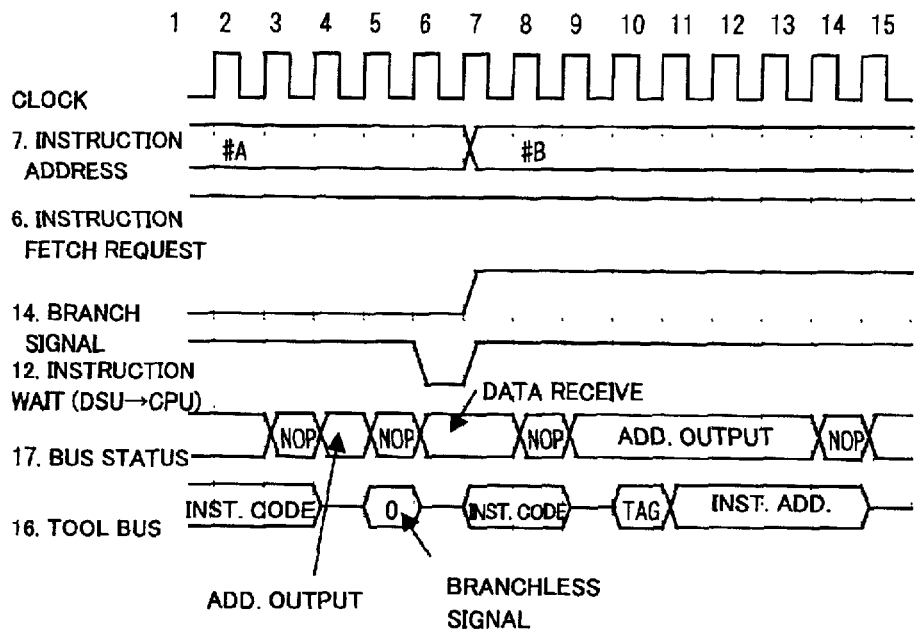
FIG. 15 is a timing chart for an operation that cancels an instruction prefetch operation when a branch is generated.
Figure 15:
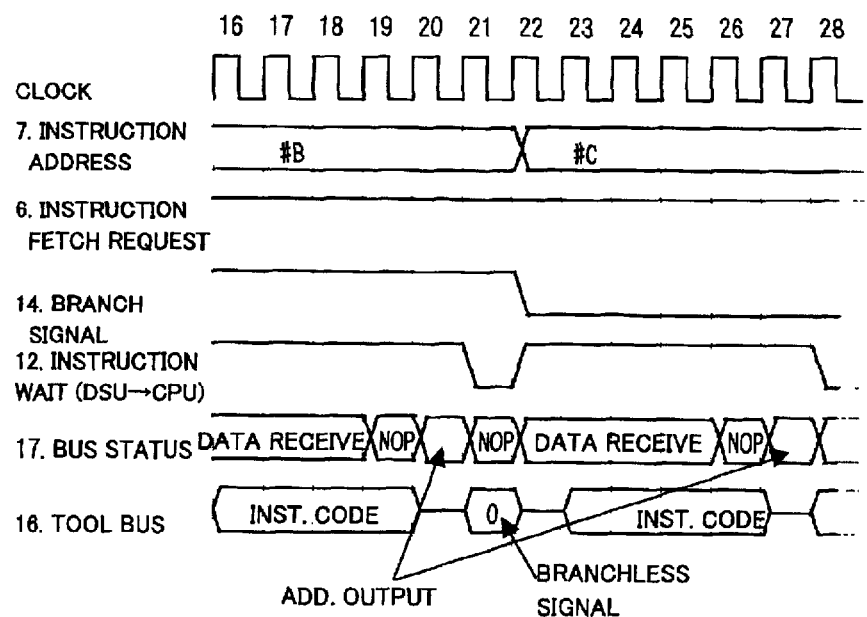

FIG. 15 is a timing chart for an operation that cancels an instruction prefetch operation when a branch is generated. In this example, when the DSU detects the existence of a branch from a branch signal 14, an NOP signal is output to the bus status signal line 17 at ninth clock, and the instruction prefetch operation undertaken until this point is canceled.

In this example, when an instruction-code reception with respect to instruction address #A has finished, the DSU outputs an address output signal to the bus status signal line 17 at the fifth clock and outputs a branchless signal to the tool bus 16 at the sixth clock, in order to initiate an instruction prefetch operation. When the DSU outputs instruction code in parallel from the receive buffer (not shown) to the CPU, the DSU cancels an instruction wait state at the seventh clock, and thus receives instruction address #B. Thereupon, the DSU detects the fact that information with a branch is contained in branch signal 14, halts the output, which has already begun, of a data-receive signal, and outputs an NOP signal to bus status signal line 17. In response thereto, the ICE halts the output of instruction code with respect to an instruction prefetch operation.

Then the DSU outputs an address output signal to the bus status signal line 17 from the tenth clock, and outputs TAG data at the eleventh clock and an effective instruction address within four cycles from the twelfth clock, from the tool bus 16. Subsequent operations are like that in the example of FIG. 14.

In the example of FIG. 15, when the existence of a branch is established upon receiving an instruction fetch request for an instruction prefetch operation, since the DSU cancels the instruction prefetch operation that began hitherto, even if an instruction code fetch is performed again, the delay for that is smaller than in the example of FIG. 14.

Figure 16:
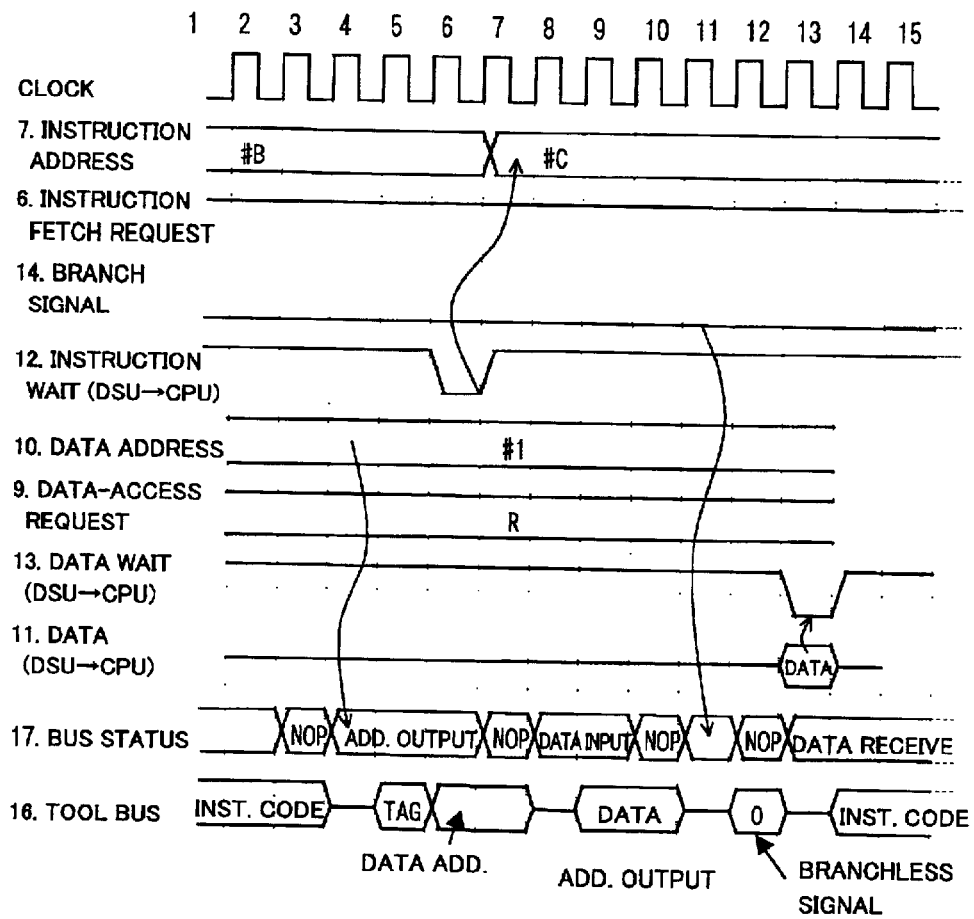
FIG. 16 is a timing chart for an instruction fetch operation and data-read operation.

FIG. 16 is a timing chart for an instruction fetch operation and data-read operation. When instruction-code reception with respect to instruction address #B has being finished, control of a data-read operation, with respect to a data address #1 for a received data access request(read request R), starts from the fifth clock. In other words, the DSU outputs an address output signal to the bus status signal line 17 from the fifth clock, and outputs, from the sixth clock, an encoded data address, along with TAG data, to tool bus 16. In addition, the DSU outputs a data input signal to the bus status signal line 17 from the ninth clock, and receives read data from the tool bus 16 after a single clock. In FIG. 16, read data is received within two cycles for the purpose of simplification. However, if read data is 16-bit data, four cycles are required for data reception.

The DSU cancels an instruction wait state at the seventh clock and thus receives the next instruction fetch request. Since this instruction fetch request is branchless, the DSU outputs an address output signal to the bus status signal line 17 at the twelfth clock after read-data reception was finished, outputs a branchless signal to the tool bus 16 at the next clock, and performs control of an instruction fetch operation with respect to an instruction address #C. Further, when the DSU outputs the read data, which was received from the ICE, from data bus 11 to the CPU in parallel, a data-wait state is canceled at the fourteenth clock.

Figure 17:
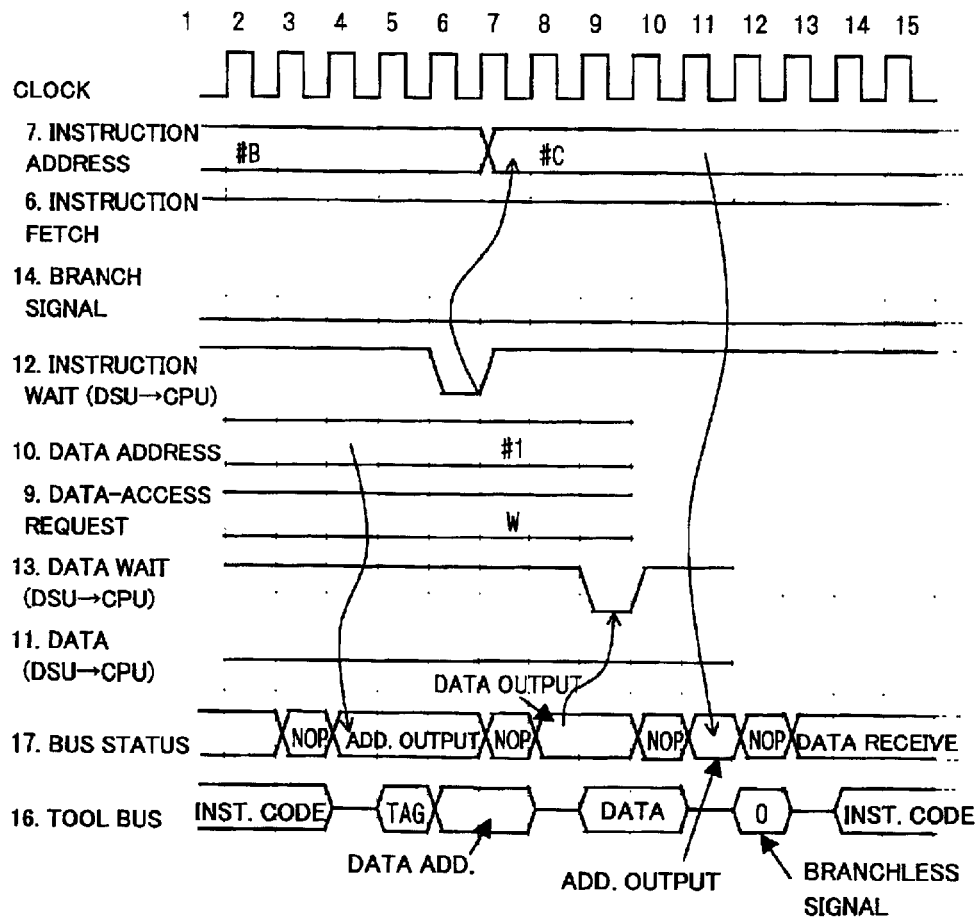
FIG. 17 is a timing chart for an instruction fetch operation and data-write operation.

FIG. 17 is a timing chart for an instruction fetch operation and data-write operation. In this example, similarly to the example of FIG. 16, when instruction-code reception with respect to instruction address #B has finished, control is initiated of a data-write request W, which has already been received. The DSU outputs an address output signal to the bus status signal line 17, and outputs, after a single clock, TAG data and an effective data address from the tool bus 16. Thereupon, the DSU outputs a data-output signal to the bus status signal line 17 from the ninth clock, and then outputs write data to the tool bus 16. Here also, for the sake of simplicity, write data transfer is finished within two cycles.

When the DSU begins data transfer, since a prediction is made that tool bus will shortly be unoccupied, the data wait state is canceled at the tenth clock. When the output of write data has finished, an address output signal is output to the bus status signal line 17, starting from the rising edge of the twelfth clock, and a branchless signal is output to the tool bus 16, and, between these output operations, an instruction fetch operation from instruction address #C is performed.

Further, in the tool bus 16, between the outputting of an address or of data from the DSU and the outputting of instruction code or read data from the ICE, an NOP state of a single cycle is generated, and a data conflict in the tool bus 16 is thus prevented. In the example of FIG. 17, an NOP signal is output to the bus status signal line 17 at the eighth clock, and, at the ninth clock, a state is assumed in which no data whatever is output to the tool bus. However, since there is no data conflict problem between the outputting of a data address and the outputting of write data, by the DSU, the generation of an NOP state is not required.

As described hereinabove, in the present embodiment, several functions are implemented in a DSU, which acts as an interface with the ICE and which is provided in a microcontroller used for development, namely: the function of shortening the instruction fetch operation cycle by outputting a branchless signal in place of an instruction address, the function of performing control of an instruction prefetch operation if the tool bus is unoccupied, and the function of shortening an instruction fetch and data-access operation cycle by converting an instruction address and a data address into an encoded address, which is composed of TAG data and an effective address, and outputting this encoded address to the ICE. As a result, it becomes possible, even in a case in which a tool bus has only a limited number of bits, to raise the efficiency of usage of this tool bus as well as the performance of access control to the ICE in debug processing.

According to the present invention described hereinabove, a debug support unit, which is provided in a microcontroller used for development, is capable of improving debug processing performance by performing efficient control of access to an external in-circuit emulator.

What is claimed is:

1. A microcontroller comprising:
   a CPU;
   a bus controller;
      an instruction address bus and an instruction code bus, of a first bit number, which connect said CPU and bus controller; and
      a debug support unit, which is connected to said instruction address bus and instruction code bus,
      wherein said debug support unit is connected to an external in-circuit emulator via a tool bus whose bit number is smaller than said first bit number and via a bus status signal line which reports on the status of the tool bus; and
      wherein said debug support unit comprises:
   a parallel to serial conversion circuit, which performs parallel to serial conversion of an instruction address;
   a status information generation circuit, which generates a status information signal, which contains branch information and an instruction fetch request, in response to a branch signal and instruction fetch request signal received from said CPU;
   a status output circuit, which outputs an instruction address output signal to said bus status signal line in response to the status information signal; and
   a data output circuit, which, in response to said status information signal, when said branch information contains a branch, outputs said converted instruction address in series to said tool bus, and when the branch information contains no branch, outputs a branchless signal in place of said instruction address to said tool bus.

2. The microcontroller according to claim 1, wherein said data-output circuit outputs said converted instruction address in series to said tool bus in a plurality of cycles when said branch information contains a branch, and outputs said branchless signal to said tool bus in a single cycle when the branch information contains no branch.

3. The microcontroller according to claim 1, wherein, after said debug support unit has performed an address output which corresponds to said instruction fetch request, the debug support unit outputs a data receive signal, over a period of a predetermined plurality of cycles, to said bus status signal line, and thus receives instruction code, which corresponds to said instruction fetch request, in series from said in-circuit emulator.

4. The microcontroller according to claim 1, wherein, when said debug support unit receives the instruction fetch request from said CPU, the debug support unit issues a wait signal to said CPU, and when instruction code, which corresponds to the instruction fetch request, is sent to said CPU in response, the debug support unit cancels said wait signal.

5. The microcontroller according to claim 1, wherein, in a case in which the instruction fetch request and a data access request have been received from said CPU, said debug support unit processes said data access request preferentially.

6. A microcontroller comprising:
a CPU;
a bus controller;
an instruction address bus and an instruction code bus, of a first bit number, which connect said CPU and bus controller; and
a debug support unit, which is connected to said instruction address bus and instruction code bus,
wherein said debug support unit is connected to an external in-circuit emulator via a tool bus whose bit number is smaller than said first bit number and via a bus status signal line which reports on the status of this tool bus;
wherein said debug support unit comprises:
a parallel to serial conversion circuit, which performs parallel to serial conversion of an instruction address;
a status information generation circuit, which generates a status information signal, which contains branch information and an instruction fetch request, in response to a branch signal and instruction fetch request signal received from said CPU;
a status output circuit, which outputs an instruction address output signal to said bus status signal line in response to said status information signal; and
a data output circuit, which, in response to said status information signal, outputs said converted instruction address in series to said tool bus, and
wherein, when said status information generation circuit finishes receiving instruction code which corresponds to a current instruction fetch request before receiving a next instruction fetch request, the status information generation circuit generates a prefetch status information signal for an instruction-prefetch request with an instruction address which succeeds the instruction address of the current instruction fetch request.

7. The microcontroller according to claim 6, wherein, when said status information generation circuit, following initiation of said instruction-prefetch request, receives the instruction fetch request from said CPU and a branch signal which contains a branch, control of said instruction-prefetch request is canceled.

8. The microcontroller according to claim 6, wherein, in response to said prefetch status information signal, said data output circuit outputs a branchless signal, in place of an instruction address, to said tool bus.

9. The microcontroller according to claim 6, wherein said status information generation circuit generates said prefetch status information signal when there is space in a buffer for storage of instruction code received from said in-circuit emulator and when said tool bus is not being used.

10. The microcontroller according to claim 6, wherein, when said debug support unit receives the instruction fetch request from said CPU, the debug support unit issues a wait signal to said CPU, and when instruction code, which corresponds to the instruction fetch request, is sent to said CPU in response, the debug support unit cancels said wait signal.

11. A microcontroller comprising:
a CPU;
and a bus controller;
an address bus, of a first bit number, which connects said CPU and bus controller; and
a debug support unit, which is connected to said address bus, wherein said debug support unit is connected to an external in-circuit emulator via a tool bus whose bit number is smaller than said first bit number and via a bus status signal line which reports on the status of this tool bus; and
wherein said debug support unit comprises:
an encoder, which outputs an encoded address which includes an effective address contained in an address and an effective digit number signal for the effective address;
a parallel to serial conversion circuit which performs parallel to serial conversion of said encoded address;
a status information generation circuit, which, in a period of the number of cycles corresponding to said effective digit number, generates a status information signal which contains an instruction fetch request or data access request, in response to an instruction fetch request signal or data access request signal, respectively received from said CPU;
a status output circuit, which outputs an address output signal to said bus status signal line in response to said status information signal; and
a data output circuit, which outputs said encoded address to said tool bus in series in response to said status information signal.

12. The microcontroller according to claim 11, wherein said address bus has an instruction address bus and a data address bus, and said encoder encodes an address which is input via said instruction address bus or data address bus.

13. A microcontroller comprising:
a CPU;
a bus controller;
an instruction address bus, of a first bit number, which connects said CPU and bus controller and transfers an instruction address in parallel; and
a debug support unit, which is connected to said instruction address bus, wherein said debug support unit is connected to an external in-circuit emulator via a tool bus whose bit number is smaller than said first bit number and via a bus status signal line which reports on the status of the tool bus; and
wherein, in a case in which an instruction fetch request received from said CPU is an instruction with a branch, said debug support unit performs parallel to serial conversion of the instruction address, and then outputs the converted instruction address to said tool bus in series, and, in a case in which said instruction fetch request is a branchless instruction, outputs a branchless signal in place of said instruction address to said tool bus.

14. A microcontroller comprising:

a CPU;

a bus controller;

an address bus, of a first bit number, which connects said CPU and bus controller; and a debug support unit, which is connected to said address bus, wherein said debug support unit is connected to an external in-circuit emulator via a tool bus whose bit number is smaller than said first bit number and via a bus status signal line which reports on the status of the tool bus; and wherein said debug support unit comprises a data output circuit, which generates an encoded address which includes an effective address contained in an address and an effective digit number signal for the effective address, and which outputs said encoded address to said tool bus in series in response to an instruction fetch request signal or data access request signal received from said CPU.

* * * * *

UNITED STATES PATENT AND TRADEMARK OFFICE
CERTIFICATE OF CORRECTION

PATENT NO. : 6,944,794 B2
DATED : September 13, 2005
INVENTOR(S) : Toru Okabayashi et al.

It is certified that error appears in the above-identified patent and that said Letters Patent is hereby corrected as shown below:

<u>Title page,</u>
Item [56], References Cited, U.S. PATENT DOCUMENTS, change
"Higashida    714/227" to -- Higashida    712/227 --.

Signed and Sealed this

Sixteenth Day of May, 2006

JON W. DUDAS
*Director of the United States Patent and Trademark Office*